(12) United States Patent
Rylskyi Rylovnikov

(10) Patent No.: US 10,904,623 B2
(45) Date of Patent: Jan. 26, 2021

(54) DEVICE-SPECIFIC FEATURE RECOMMENDATIONS

(71) Applicant: DISH UKRAINE L.L.C., Kharkov (UA)

(72) Inventor: Igor Rylskyi Rylovnikov, Kharkov (UA)

(73) Assignee: DISH UKRAINE L.L.C., Kharkov (UA)

( * ) Notice: Subject to any disclaimer, the term of this patent is extended or adjusted under 35 U.S.C. 154(b) by 0 days.

(21) Appl. No.: 15/535,648

(22) PCT Filed: Dec. 29, 2014

(86) PCT No.: PCT/UA2014/000138
§ 371 (c)(1),
(2) Date: Jun. 13, 2017

(87) PCT Pub. No.: WO2016/108801
PCT Pub. Date: Jul. 7, 2016

(65) Prior Publication Data
US 2017/0339461 A1    Nov. 23, 2017

(51) Int. Cl.
*H04N 21/466* (2011.01)
*H04N 21/442* (2011.01)
(Continued)

(52) U.S. Cl.
CPC ..... *H04N 21/4668* (2013.01); *H04N 21/4405* (2013.01); *H04N 21/44204* (2013.01);
(Continued)

(58) Field of Classification Search
CPC ........... A63F 2300/6027; G06F 3/0481; G06F 3/04895; G06F 9/453; G06F 3/0482;
(Continued)

(56) References Cited

U.S. PATENT DOCUMENTS 6,377,286 B1    4/2002  Hochmuth
2001/0012024 A1*  8/2001  Rosin ................ G06F 17/30884
                                             715/841

(Continued)

FOREIGN PATENT DOCUMENTS

EP    0 427 264 A2    5/1991
WO    2002043353 A2    5/2002

(Continued)

OTHER PUBLICATIONS

International Search Report and Written Opinion for PCT/UA2014/000138 dated Jul. 15, 2015, all pages.

(Continued)

*Primary Examiner* — Michael R Telan

(57) ABSTRACT

Device-specific feature recommendations to enhance end-user quality-of-experience. In one example implementation, end-user interactions with a television receiver may be monitored. If it is discovered that one or more convenience or programming features have not been previously accessed, the television receiver itself may instantiate a process to notify an end-user that a number of features or services are in fact available or accessible, and also possibly provide a simplified method or means for access to such features or services.

18 Claims, 7 Drawing Sheets

(51) Int. Cl.
- *H04N 21/45* (2011.01)
- *H04N 21/482* (2011.01)
- *H04N 21/4405* (2011.01)
- *H04N 21/858* (2011.01)
- *H04N 21/4147* (2011.01)

(52) U.S. Cl.
CPC . *H04N 21/44213* (2013.01); *H04N 21/44222* (2013.01); *H04N 21/4532* (2013.01); *H04N 21/466* (2013.01); *H04N 21/482* (2013.01); *H04N 21/4821* (2013.01); *H04N 21/8586* (2013.01); *H04N 21/4147* (2013.01)

(58) Field of Classification Search
CPC .............. H04N 21/4668; H04N 21/466; H04N 21/482; H04N 21/44213; H04N 21/4405; H04N 21/44204; H04N 21/4821; H04N 21/8586; H04N 21/44222; H04N 21/4532; H04N 21/4147
See application file for complete search history.

(56) References Cited

U.S. PATENT DOCUMENTS

| | | | |
|---|---|---|---|
| 2004/0117831 A1* | 6/2004 | Ellis | H04N 5/44543 725/53 |
| 2007/0047520 A1 | 3/2007 | Byers et al. | |
| 2007/0098351 A1 | 5/2007 | East et al. | |
| 2008/0144956 A1* | 6/2008 | Meisner | G06K 9/036 382/255 |
| 2008/0148317 A1* | 6/2008 | Opaluch | H04N 21/466 725/46 |
| 2009/0113345 A1 | 4/2009 | Ishiguro | |
| 2009/0249387 A1 | 10/2009 | Magdy et al. | |
| 2010/0058395 A1 | 3/2010 | Goergen et al. | |
| 2011/0028138 A1* | 2/2011 | Davies-Moore | G06F 3/04817 455/418 |
| 2013/0061259 A1* | 3/2013 | Raman | H04H 60/32 725/14 |
| 2013/0088352 A1 | 4/2013 | Amis | |
| 2017/0374397 A1 | 12/2017 | Rylskiy | |

FOREIGN PATENT DOCUMENTS

| | | |
|---|---|---|
| WO | 2016/099433 A1 | 6/2016 |
| WO | 2016/108801 A1 | 7/2016 |

OTHER PUBLICATIONS

International Search Report and Written Opinion for PCT/UA2014/000131 dated May 29, 2015, all pages.
International Preliminary Report on Patentability for PCT/UA2014/000131 dated Jun. 20, 2017, all pages.
U.S. Appl. No. 15/536,055, filed Jun. 14, 2017, Non-Final Rejection dated Apr. 25, 2018, all pages.
U.S. Appl. No. 15/536,055, filed Jun. 14, 2017, Final Rejection dated Jul. 16, 2018, all pages.
U.S. Appl. No. 15/536,055, filed Jun. 14, 2017, Non-Final Rejection dated Nov. 30, 2018, all pages.
U.S. Appl. No. 15/536,055, filed Jun. 14, 2017 Final Rejection dated Mar. 4, 2019, all pages.

* cited by examiner

DEVICE-SPECIFIC FEATURE RECOMMENDATIONS

CROSS-REFERENCE TO RELATED APPLICATIONS

This application is a U.S. National Stage of PCT International Application No. PCT/UA2014/000138, filed on Dec. 29, 2014, entitled "Device-Specific Feature Recommendations," which is hereby incorporated by reference in its entirety.

BACKGROUND

The advent of the digital video recorder, multi-tuner television receiver, and the availability of high-capacity and affordable computer-readable storage devices have made available many possibilities to television programming service providers and viewers alike. In addition, viewers have come to expect insight and convenience with respect to the accessing of content via their television receivers.

SUMMARY

In an aspect, a method may include or comprise: determining, by a computing device, number of times particular features of the computing device are accessed over a period of time; identifying, by the computing device, particular features of the computing device accessed over the period of time a number of times less than or equal to a predetermined threshold value; and outputting, by the computing device for presentation by a display device, a user interface that itemizes particular features of the computing device accessed over the period of time a number of times less than or equal to the predetermined threshold value.

In an aspect, a television receiver may include or comprise a processor; and a memory communicatively coupled with and readable by the processor and having stored processor-readable instructions that, when executed by the processor, cause the processor to: identify particular features of the television receiver accessed over a period of time a number of times less than or equal to a predetermined threshold value; and output, for display by a presentation device, an interface that itemizes particular features of the television receiver accessed over the period of time a number of times less than or equal to the predetermined threshold value.

In an aspect, a method may include or comprise monitoring, by a television receiver, number of times features of the television receiver are accessed over a period of time; determining, by the television receiver subsequent the period of time, features of the television receiver accessed over the period of time a number of times less than or equal to a predetermined threshold value; and outputting, by the television receiver for presentation by a display device, an indication of particular features of the television receiver accessed over the period of time a number of times less than or equal to the predetermined threshold value.

Other aspects are possible.

DETAILED DESCRIPTION

Figure 1:
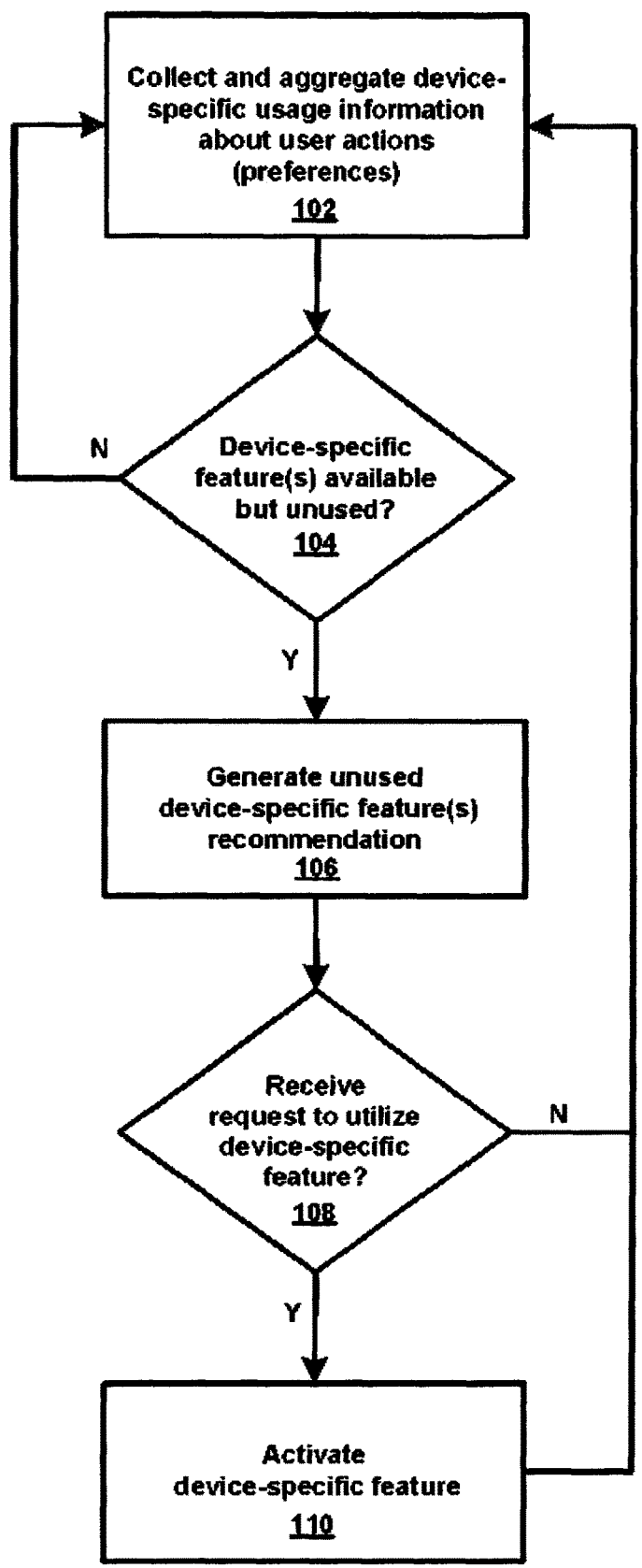
FIG. 1 shows a first example method according to the disclosure.

The present disclosure is generally directed to or towards systems and methods for enhancing end-user QoE (Quality-of-Experience). This is achieved at least in part by monitoring end-user interactions with a particular computing device, and then providing recommendations to the end-user as to features or services that are available for access but are not or have not been previously used or utilized. It is contemplated that the applicability of such an implementation is far and wide-reaching. Specifically, the various features or aspects of the present disclosure may be applicable to virtually any consumer electronics scenario in which an end-user might not be inclined or even interested in exploring each and every feature or service offered by a particular computing device or system.

For example, it is contemplated that the features or aspects of the present disclosure may be applicable to the automotive industry. In this example, a particular new automobile may have a computer system including a touchscreen display that may enable an end-user to access various features or functionality, such as satellite radio, hands-free telephony, etc. Such features or functionality may typically be accessed via selection of corresponding icons as displayed on a "home" screen; other features or functionality however may be available for access or use, that which might not necessarily be accessible via the home screen. For example, rear-view camera features or functionality may only be accessible via navigation through a directory-file-system-like structure, where a particular icon or button or control in each of a number of different screens has to be selected in order for the end-user to access corresponding features or functionality. Here, it is contemplated that end-user interactions with the automobile computer system may be monitored over time, and if it is discovered that the rear-view camera features or functionality have not yet been accessed, the computer system itself may notify the end-user that such features or functionality are in fact available or accessible, and also possibly provide a simplified method or means for access to such features or functionality. It will be appreciated that such an implementation may substantially enhance end-user QoE.

As yet another example, it is contemplated that the features or aspects of the present disclosure may be applicable to the satellite television industry. For example, a particular television receiver may include or otherwise exhibit special-purpose software and/or firmware to enable an end-user to access various convenience or programming features. Typically, such features may be accessed via selection of corresponding icons as displayed within or via an EPG (Electronic Programming Guide); however, such features may not necessarily be immediately or instantly accessible and instead, similar to that described above in connection with the automotive example, may only be accessible via navigation through a number of different "screens." However, the end-user might not be inclined or even interested in investing the time to explore each and every feature or service offered or at least implemented by the television receiver (and/or satellite television provider). Here, it is contemplated that end-user interactions with the television receiver may be monitored, and if it is discovered that one or more convenience or programming features have not been previously accessed, the television receiver itself may instantiate a process to notify the end-user that a number of features or services are in fact available or accessible, and also possibly provide a simplified method or means for access to such features or services. Again, it will be appreciated that such an implementation may substantially enhance end-user QoE.

Still many other examples as to the applicability of the features of the present disclosure are possible. For purpose of discussion though, the features of the present disclosure are discussed in the context of a satellite television implementation. Although not so limited, an appreciation of the various aspects of the present disclosure may be gained from the following discussion in connection with the drawings. For instance, referring now to FIG. 1, an example method 100 is shown in accordance with the present disclosure.

At step 102, a particular television receiver may over time collect and aggregate information associated with usage of or access to convenience or programming features or services offered or provided or made available by the television receiver. For instance, over a particular time period of one (1) month, for example, the particular television receiver may count how many times a "Favorites Menu" is used or utilized to access certain broadcast programming, and how many times a "Recording Timer" is used or utilized to record certain broadcast programming. It will be appreciated that many other examples are possible, and it is contemplated that, in practice, use or usage information may be acquired and/or quantified for each and every convenience or programming or service feature or functionality offered or made available by the particular television receiver in accordance with the principles of the present disclosure, and also that such features or functionality may or may not be implementation-specific.

Next, at step 104, the particular television receiver may at least identify which ones of the convenience or programming features or services offered or provided or made available by the television receiver have not yet been accessed. Additionally, in some examples, the particular television receiver may at least identify which ones of the convenience or programming features or services offered or provided or made available by the television receiver have been infrequently accessed. Here, it is contemplated that such a determination may be made in light of a pre-defined and user-configurable, possibly feature-specific, threshold value. For example, access of the Favorites Menu might be considered infrequent if over a period of one month the same has only been accessed ten (10) or less times. In contrast, usage of Recording Timer functionality might be considered infrequent if over a period of one month the same has only been used or utilized five (5) or less times.

In other examples, at step 104, the particular television receiver determines list of available device-specific features and checks was applied every feature at least once during period. If any particular feature is not applied during period then television receiver software try to help with using of such feature. For example, favorite list can be formed according information about user preferences gathered and aggregated at step 102. As another example, a user may be subscribed to 160 different channels. According to gathered information it may be derived that the user likes to watch historical movies. It is contemplated that several channels can be proposed for the user where historical movies are often broadcasted, even though these channels were never visited by the user.

If, for example, the particular television receiver determines at step 104 that each of the ones of the convenience or programming features or services offered or provided or made available by the television receiver have been accessed or used or utilized at least once, and/or have been accessed or used or utilized a requisite number of times over a particular time period, process flow within the method 100 may branch back to step 102. Such a branch is intended to show that flow within the method 100 is continuous, so as to proactively enhance end-user QoE at all times. If, however, the particular television receiver determines at step 104 that each of the ones of the convenience or programming features or services offered or provided or made available by the television receiver have not been accessed or used or utilized at least once, and/or have not been accessed or used or utilized a requisite number of times over a particular time period, process flow within the method 100 may branch back to step 106.

At step 106, the particular television receiver may instantiate a process to notify an end-user that one or more features or services as offered or made available by or via the particular television receiver are in fact available or accessible. For example, the particular television receiver may generate and subsequently output for display by a presentation device, such as a television for instance, an interface that specifies "A Favorites Menu convenience feature is available for use. Click Here to populate your Favorites Menu, and save time in accessing your favorite televisions channels!" In this manner, the particular television receiver may not only provide an indication to the end-user that one or more convenience or programming features or services offered or provided or made available by the particular television receiver are available for use or access, but also provide a "shortcut" to allow the end-user to very quickly access any particular one of the one or more convenience or programming features or services offered or provided or made available by the particular television receiver. It is contemplated then that the end-user may selectively choose to access (or not) any particular one of the one or more convenience or programming features or services offered or provided or made available by the particular television receiver.

For example, at step 108, the particular television receiver may determine whether or not a particular "shortcut" was selected or accessed to allow the end-user to very quickly access any particular one of the one or more convenience or programming features or services offered or provided or made available by the particular television receiver. If, for example, the particular television receiver determines or otherwise identifies that a particular "shortcut" was not selected or accessed, process flow within the method 100 may branch back to step 102. Such a branch is intended to show that flow within the method 100 is continuous, so as to at least attempt to enhance end-user QoE at all times.

If, however, the particular television receiver determines or otherwise identifies that a particular "shortcut" was selected or accessed, process flow within the method 100 may branch back to step 110. At step 110, the particular television receiver may activate a corresponding convenience or programming feature or service offered or provided or made available by the particular television so that the end-user may immediately access and leverage the same. For example, at step 110, the particular television receiver may generate and subsequently output for display by a presentation device, such as a smartphone for instance, a Favorites Menu interface to enable the end-user to populate the same in order to minimize the amount of time needed to access their favorite or most preferred television channels. As a variant, it is contemplated that steps 104-110 can be repeated in a cycle, to provide a feature-by-feature recommended so as to not overload an end-user with information.

Such an implementation as discussed in connection with FIG. 1 may be beneficial and/or advantageous in many respects including. For example, the features or aspects as discussed in the context of FIG. 1 may, among other things, serve to entice new customers to subscribe to services as offered by a particular satellite television provider, as well as provide an incentive for existing customers to maintain their loyalty and/or relationship with the particular satellite television provider. Such benefits or aspect may apply similarly depending on implementation-specific details.

For example, in the context of an automotive industry implementation, the features or aspects as discussed in the context of the present disclosure may, among other things, serve to entice new customers to purchase an automobile from a particular automobile manufacturer, as well as provide an incentive for existing customers to maintain their loyalty and/or relationship with the automobile manufacturer. For example, it is contemplated that a particular automobile computer system could flashed or (re)programmed to exhibit the various features or aspects of the present disclosure. Other benefits and/or advantages are possible as well. For example, for an end-user user with clearly defined or derived interests, additional promotional material may be proposed according gathered/aggregated information. Additionally, brand adoption may be encouraged since an end-user may more fully use or leverage new advanced features of a particular electronic device. Further scenarios and/or beneficial aspects associated with enhancing end-user QoE are described in detail below in connection with FIGS. 2-7.

Figure 2:
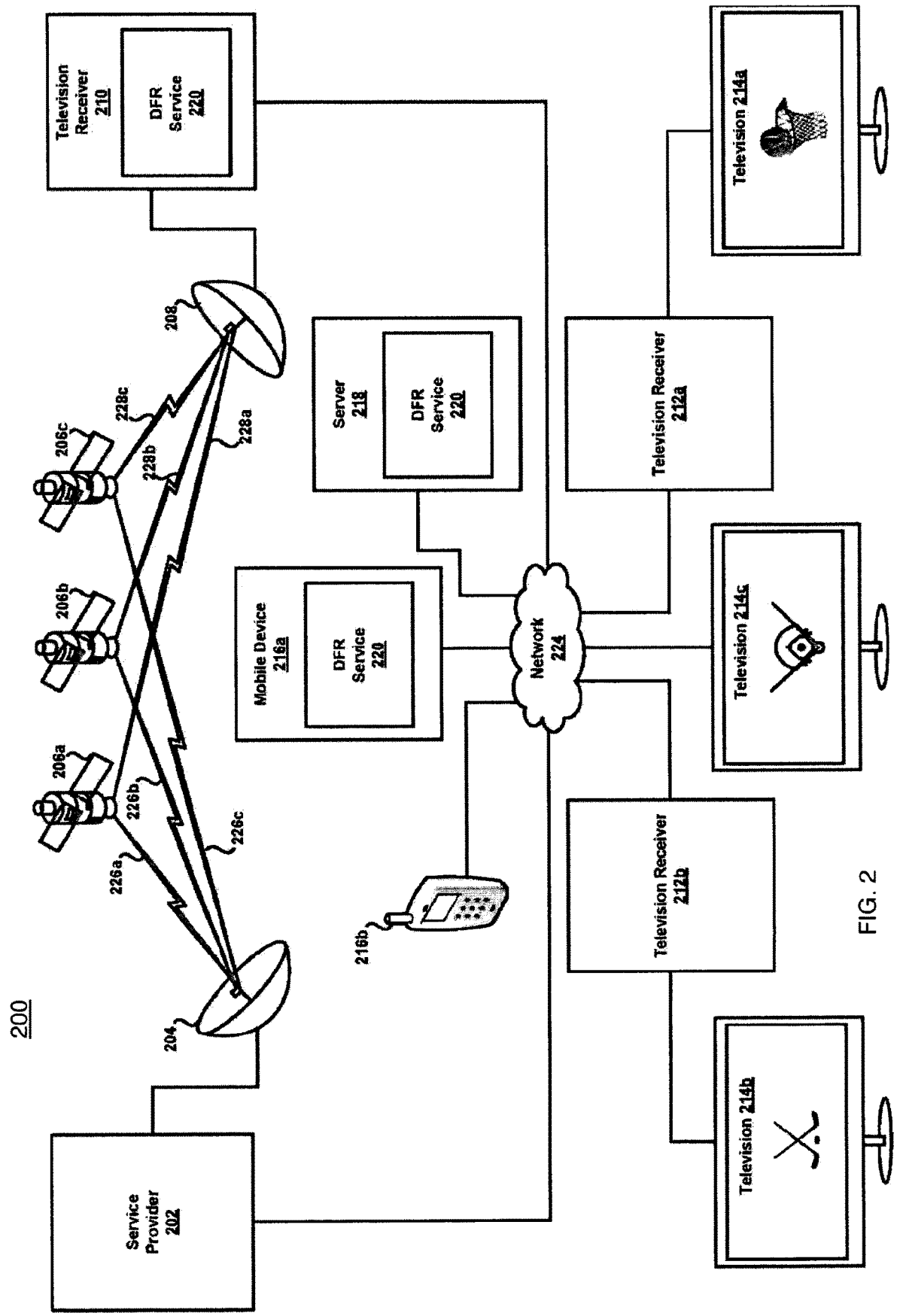
FIG. 2 shows an example content distribution system according to the disclosure.

Referring now to FIG. 2, an example satellite television distribution system 200 is shown in accordance with the present disclosure. For brevity, the system 200 is depicted in a simplified form, and may include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of media content distribution system as desired.

The example system 200 may include a service provider 202, a satellite uplink 204, a plurality of satellites 206*a-c*, a satellite dish 208, a PTR (Primary Television Receiver) 210, a plurality of STRs (Secondary Television Receivers) 212*a-b*, a plurality of televisions 214*a-c*, a plurality of computing devices 216*a-b*, and at least one server 218 that may be associated with the service provider 202. Additionally, the PTR 210, computing devices 216*a-b*, and server 218 may include or otherwise exhibit an DFR (Device-specific Feature Recommendation) service 220. In general, the DFR service 220 may be configured and/or arranged to implement various features or aspects of the present disclose associated with enhancing end-user QoE. Such features may be beneficial and/or advantageous in many respects. For example, *** Still other benefits and/or advantages are possible as well, and an appreciation of such benefits and/or advantages may be understood in light of the present disclosure in its entirety.

The system 200 may further include at least one network 224 that establishes a bidirectional communication path for data transfer between and among each respective element of the system 200, outside or separate from the unidirectional satellite signaling path. The network 224 is intended to represent any number of terrestrial and/or non-terrestrial network features or elements. For example, the network 224 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the system 200.

The PTR 210, and the STRs 212*a-b*, as described throughout may generally be any type of television receiver, television converter, etc., such as a STB for example. In another example, the PTR 210, and the STRs 212*a-b*, may exhibit functionality integrated as part of or into a television, a DVR (Digital Video Recorder), a computer such as a tablet computing device, or any other computing system or device, as well as variations thereof. Further, the PTR 210 and the network 224, together with the STRs 212*a-b* and televisions 214*a-c*, and possibly the computing devices 216*a-b*, may each be incorporated within or form at least a portion of a particular home computing network. Further, the PTR 210 may be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other examples are possible. For example, one or more of the various elements or components of the system 200 may be configured to communicate in accordance with the MoCA® (Multimedia over Coax Alliance) home entertainment networking standard. Still other examples are possible.

In practice, the satellites 206*a-c* may each be configured to receive uplink signals 226*a-c* from the satellite uplink 204. In this example, each the uplink signals 226*a-c* may contain one or more transponder streams of particular data or content, such as one or more particular television channels, as supplied by the service provider 202. For example, each of the respective uplink signals 226*a-c* may contain various media or media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 206*a-c*.

Further, different media content may be carried using different transponders of a particular satellite (e.g., satellite 206*a*); thus, such media content may be transmitted at different frequencies and/or different frequency ranges. For example, a first and second television channel may be carried on a first carrier frequency over a first transponder of satellite 206*a*, and a third, fourth, and fifth television channel may be carried on second carrier frequency over a first transponder of satellite 206*b*, or, the third, fourth, and fifth television channel may be carried on a second carrier frequency over a second transponder of satellite 206a, and etc. Each of these television channels may be scrambled such that unauthorized persons are prevented from accessing the television channels.

The satellites 206a-c may further be configured to relay the uplink signals 226a-c to the satellite dish 208 as downlink signals 228a-c. Similar to the uplink signals 226a-c, each of the downlink signals 228a-c may contain one or more transponder streams of particular data or content, such as various encoded and/or at least partially electronically scrambled television channels, on-demand programming, etc., in accordance with an allotted carrier frequency and bandwidth. The downlink signals 228a-c, however, may not necessarily contain the same or similar content as a corresponding one of the uplink signals 226a-c. For example, the uplink signal 226a may include a first transponder stream containing at least a first group or grouping of television channels, and the downlink signal 228a may include a second transponder stream containing at least a second, different group or grouping of television channels. In other examples, the first and second group of television channels may have one or more television channels in common. In sum, there may be varying degrees of correlation between the uplink signals 226a-c and the downlink signals 228a-c, both in terms of content and underlying characteristics.

Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, and etc. Further, the term "channel," may in some contexts carry a different meaning from or than its normal plain language meaning. For example, the term "channel" may denote a particular carrier frequency or sub-band which can be tuned to by a particular tuner of a television receiver. In other contexts though, the term "channel" may refer to a single program/content service such as HBO®.

Additionally, a single satellite may typically have multiple transponders (e.g., 32 transponders) each one broadcasting a channel or frequency band of about 24-27 MHz in a broader frequency or polarity band of about 500 MHz. Thus, a frequency band of about 500 MHz may contain numerous sub-bands or channels of about 24-27 MHz, and each channel in turn may carry a combined stream of digital data comprising a number of content services. For example, a particular hypothetical transponder may carry HBO®, CBS®, ESPN®, plus several other channels, while another particular hypothetical transponder may itself carry 3, 4, 5, 6, etc., different channels depending on the bandwidth of the particular transponder and the amount of that bandwidth occupied by any particular channel or service on that transponder stream. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized. Other examples are possible.

Continuing with the example scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 228a-c, from one or more of the satellites 206a-c. Based on the characteristics of the PTR 210 and/or satellite dish 208, however, it may only be possible to capture transponder streams from a limited number of transponders concurrently. For example, a particular tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular transponder streams to the television 214c for display thereon. For example, the satellite dish 208 and the PTR 210 may, respectively, be configured to receive, decode, and relay at least one premium HD-formatted television channel to the television 214c. Programming or content associated with the HD channel may generally be presented live, or from a recording as previously stored on, by, or at the PTR 210. Here, the HD channel may be output to the television 214c in accordance with the HDMI/HDCP content protection technologies. Other examples are however possible.

Further, the PTR 210 may select via tuner, decode, and relay particular transponder streams to one or both of the STRs 212a-b, which may in turn relay particular transponder streams to a corresponding one of the televisions 214a-b for display thereon. For example, the satellite dish 208 and the PTR 210 may, respectively, be configured to receive, decode, and relay at least one television channel to the television 214a by way of the STR 212a. Similar to the above-example, the television channel may generally be presented live, or from a recording as previously stored on the PTR 210, and may be output to the television 214a by way of the STR 212a in accordance with a particular content protection technology and/or networking standard. Still further, the satellite dish 208 and the PTR 210 may, respectively, be configured to receive, decode, and relay at least one premium television channel to one or each of the computing devices 216a-c. Similar to the above-examples, the television channel may generally be presented live, or from a recording as previously stored on the PTR 210, and may be output to one or both of the computing devices 216a-c in accordance with a particular content protection technology and/or networking standard.

Figure 3:
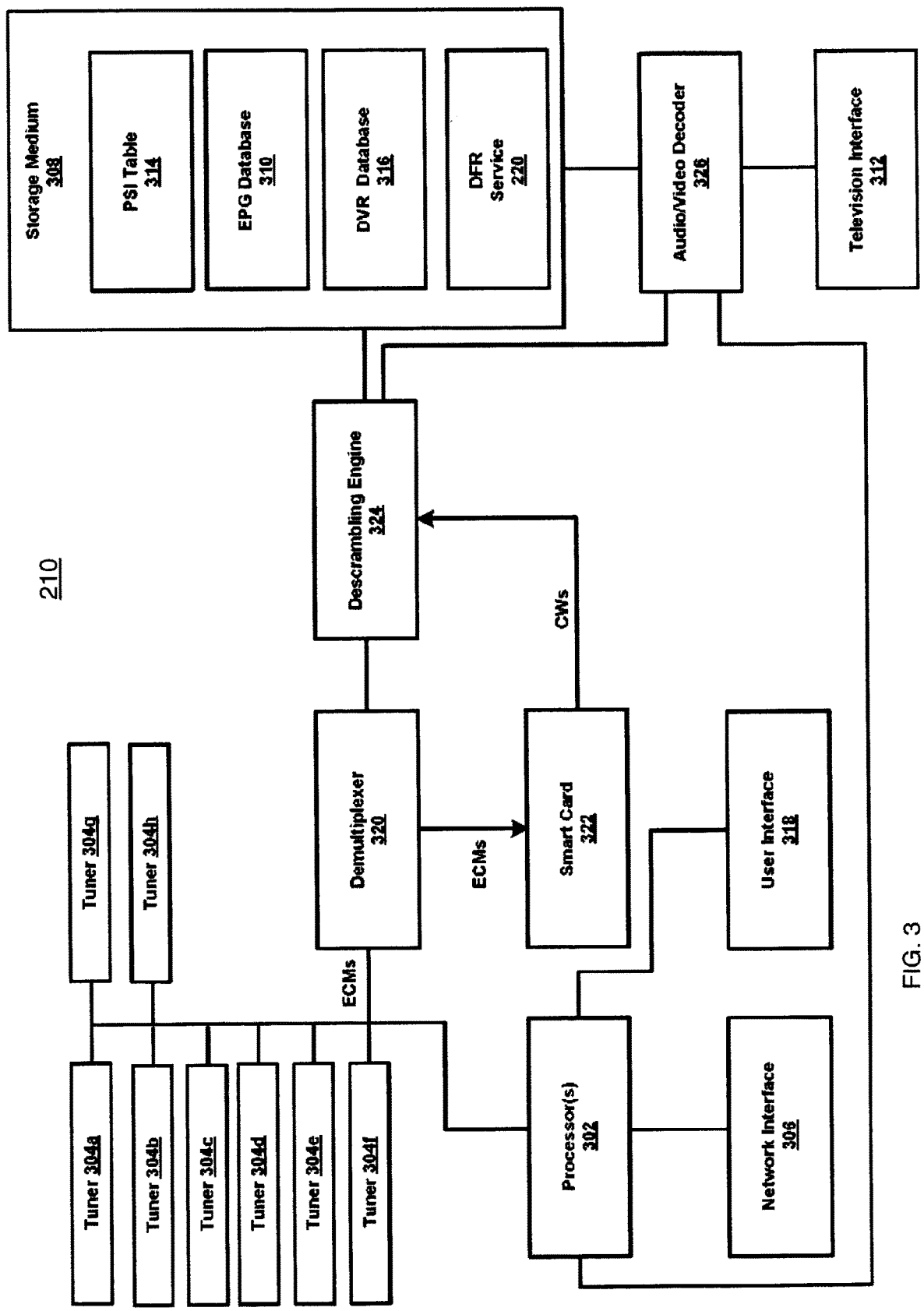
FIG. 3 shows an example block diagram of a television receiver of FIG. 2.

Referring now to FIG. 3, an example block diagram of the PTR 210 of FIG. 2 is shown in accordance with the disclosure. In some examples, the STRs 212a-b may be configured in a manner similar to that of the PTR 210. In some examples, the STRs 212a-b may be configured and arranged to exhibit a reduced functionality as compared to the PTR 210, and may depend at least to a certain degree on the PTR 210 to implement certain features or functionality. The STRs 212a-b in this example may be each referred to as a "thin client."

The PTR 210 may include one or more processors 302, a plurality of tuners 304a-h, at least one network interface 306, at least one non-transitory computer-readable storage medium 308, at least one EPG database 310, at least one television interface 312, at least one PSI (Program Specific Information) table 314, at least one DVR database 316, at least one user interface 318, at least one demultiplexer 320, at least one smart card 322, at least one descrambling engine 324, and at least one decoder 326. In other examples, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation.

The processors 302 may include one or more specialized and/or general-purpose processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304a-h may be used to tune to television channels, such as television channels transmitted via satellites 206a-c. Each one of the tuners 304a-h may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304a) may be used to tune to a television channel on a first transponder stream for display using a television, while another tuner (e.g., tuner 304b) may be used to tune to a television channel on a second transponder for recording and viewing at some other time. If multiple television channels transmitted on the same transponder stream are desired, a particular tuner (e.g., tuner 304c) may be used to receive the signal containing the multiple television channels for presentation and/or recording of each of the respective multiple television channels, such as in a PTAT (Primetime Anytime) implementation for example. Although eight tuners are shown, the PTR 210 may include more or fewer tuners (e.g., three tuners, sixteen tuners, etc.), and the features of the disclosure may be implemented similarly and scale according to the number of tuners of the PTR 210.

The network interface 306 may be used to communicate via alternate communication channel(s) with a service provider. For example, the primary communication channel between the service provider 202 of FIG. 2 and the PTR 210 may be via satellites 206a-c, which may be unidirectional to the PTR 210, and an another communication channel between the service provider 202 and the PTR 210, which may be bidirectional, may be via the network 224. In general, various types of information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the DFR service 220 mentioned above. Recorded television programs may be stored using the storage medium 308 and ultimately accessed therefrom.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites 206a-c of FIG. 2. For example, updates to the EPG database 310 may be received periodically or at least intermittently via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308, or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In this example, eight television channels may be decoded concurrently or simultaneously.

The television interface 312 output a signal to a television, or another form of display device, in a proper format for display of video and play back of audio. As such, the television interface 312 may output one or more television channels, stored television programming from the storage medium 308, such as television programs from the DVR database 316 and/or information from the EPG database 310 for example, to a television for presentation.

The PSI table 314 may store information used by the PTR 210 to access various television channels. Information used to populate the PSI table 314 may be received via satellite, or cable, through the tuners 304a-h and/or may be received via the network interface 306 over the network 224 from the service provider 202 shown in FIG. 2. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some examples, the PSI table 314 may be divided into a number of tables, such as a NIT (Network Information Table), a PAT (Program Association Table), and a PMT (Program Management Table).

Table 1 below provides a simplified example of the PSI table 314 for several television channels. It should be understood that in other examples, many more television channels may be represented in the PSI table 314. The PSI table 314 may be periodically or at least intermittently. As such, television channels may be reassigned to different satellites and/or transponders, and the PTR 210 may be able to handle this reassignment as long as the PSI table 314 is updated.

TABLE 1

| Channel | Satellite | Transponder | ECM PID | Audio PIDs | Video PID |
|---|---|---|---|---|---|
| 4 | 1 | 2 | 27 | 2001 | 1011 |
| 5 | 2 | 11 | 29 | 2002 | 1012 |
| 7 | 2 | 3 | 31 | 2003 | 1013 |
| 13 | 2 | 4 | 33 | 2003, 2004 | 1013 |

It should be understood that the values provided in Table 1 are for example purposes only. Actual values, including how satellites and transponders are identified, may vary. Additional information may also be stored in the PSI table 314. Video and/or audio for different television channels on different transponders may have the same PIDs. Such television channels may be differentiated based on which satellite and/or transponder to which a tuner is tuned.

DVR functionality of the PTR 210 may permit a television channel to be recorded for a period of time. The DVR database 316 may store timers that are used by the processors 302 to determine when a television channel should be tuned to and recorded to the DVR database 316 of storage medium 308. In some examples, a limited amount of space of the storage medium 308 may be devoted to the DVR database 316. Timers may be set by the service provider 202 and/or one or more users of the PTR 210. DVR functionality of the PTR 210 may be configured by a user to record particular television programs. The PSI table 314 may be used by the PTR 210 to determine the satellite, transponder, ECM PID, audio PID, and video PID.

The user interface 318 may include a remote control, physically separate from PTR 210, and/or one or more buttons on the PTR 210 that allows a user to interact with the PTR 210. The user interface 318 may be used to select a television channel for viewing, view information from the EPG database 310, and/or program a timer stored to the DVR database 316 wherein the timer may be used to control the DVR functionality of the PTR 210.

Referring back to the tuners 304a-h, television channels received via satellite may contain at least some encrypted or scrambled data. Packets of audio and video may be scrambled to prevent unauthorized users, such as nonsubscribers, from receiving television programming without paying the service provider 202. When one of the tuners 304a-h is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs may be periodically transmitted. ECMs may be encrypted; the PTR 210 may use the smart card 322 to decrypt ECMs.

The smart card 322 may function as the CA (Controlled Access) which performs decryption of encryption data to obtain control words that are used to descramble video and/or audio of television channels. Decryption of an ECM may only be possible when the user (e.g., an individual who is associated with the PTR 210) has authorization to access the particular television channel associated with the ECM. When an ECM is received by the demultiplexer 320 and the ECM is determined to correspond to a television channel being stored and/or displayed, the ECM may be provided to the smart card 322 for decryption.

When the smart card 322 receives an encrypted ECM from the demultiplexer 320, the smart card 322 may decrypt the ECM to obtain some number of control words. In some examples, from each ECM received by the smart card 322, two control words are obtained. In some examples, when the smart card 322 receives an ECM, it compares the ECM to the previously received ECM. If the two ECMs match, the second ECM is not decrypted because the same control words would be obtained. In other examples, each ECM received by the smart card 322 is decrypted; however, if a second ECM matches a first ECM, the outputted control words will match; thus, effectively, the second ECM does not affect the control words output by the smart card 322. When an ECM is received by the smart card 322, it may take a period of time for the ECM to be decrypted to obtain the control words. As such, a period of time, such as about 0.2-0.5 seconds, may elapse before the control words indicated by the ECM can be obtained. The smart card 322 may be permanently part of the PTR 210 or may be configured to be inserted and removed from the PTR 210.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some examples, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304a-h may be scrambled. The video and/or audio may be descrambled by the descrambling engine 324 using a particular control word. Which control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

For brevity, the PTR 210 is depicted in a simplified form, and may generally include more or fewer elements or components as desired, including those configured and/or arranged for implementing various features for enhancing end-user QoE. For example, the PTR 210 is shown in FIG. 3 to include the DFR service 220 as mentioned above in connection with FIG. 2. Further, some routing between the various modules of PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules.

Additionally, although not explicitly shown in FIG. 3, the PTR 210 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 210 may be configured to include any number of other various components or logical modules that are implemented in hardware, software, firmware, or any combination thereof, and such components or logical modules may or may not be implementation-specific.

Figure 4:
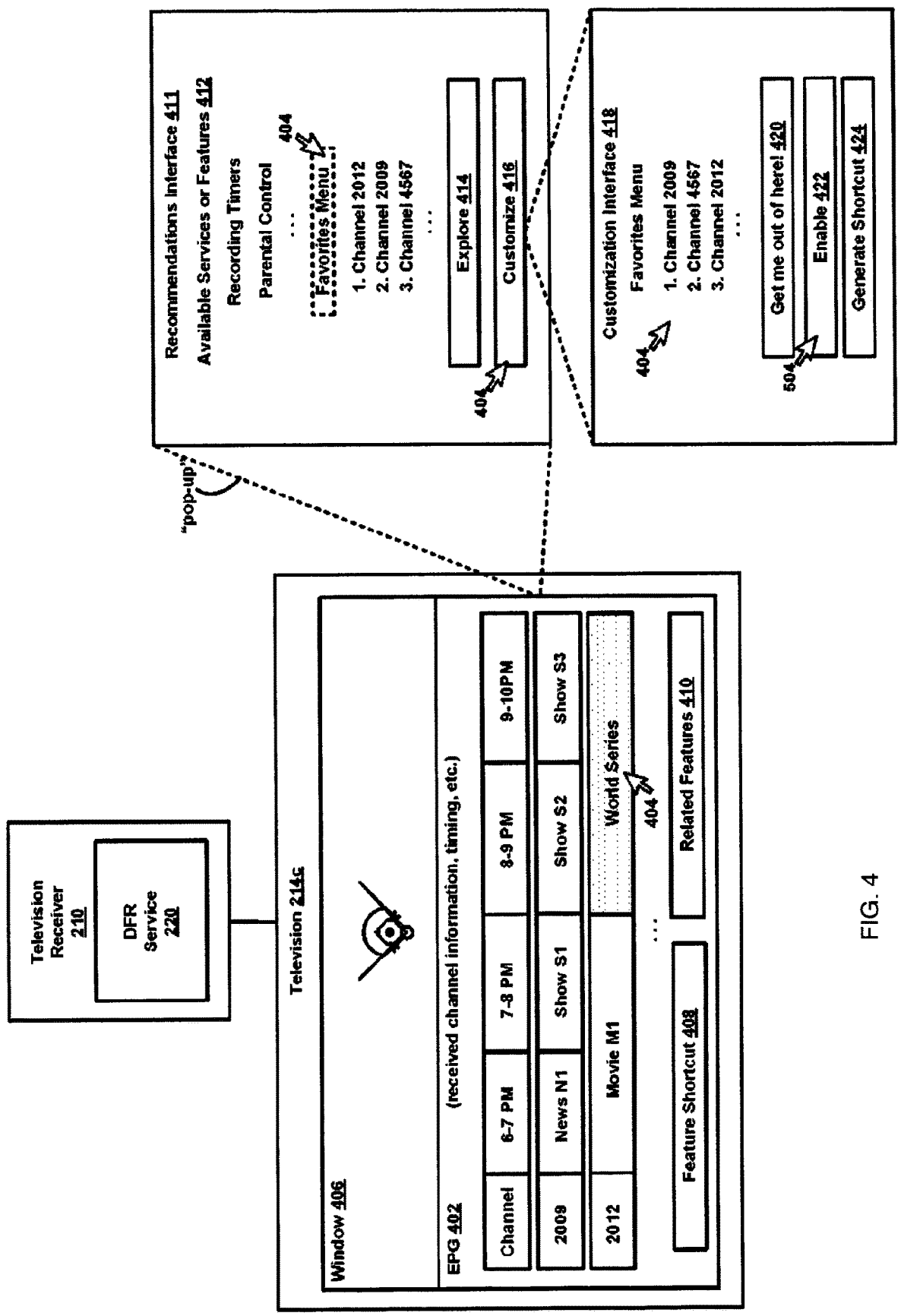
FIG. 4 shows first example aspects of the system of FIG. 2 in detail.

Referring now to FIG. 4, first example aspects of the system 200 of FIG. 2 are shown in accordance with the present disclosure. In particular, the PTR 210 may be configured to output an EPG (Electronic Programming Guide) 402 to and for presentation the television 214c, for example. The EPG 402 may at least present various information related to television channels and the timing of programs or programming appearing on such television channels. For example, as shown in FIG. 4, the EPG 402 may display information associated with a channel 2012, where the "World Series" is listed as scheduled to appear on that channel starting at a particular time on a particular day, and etc. In this example, and assuming that a current or instant time is sometime during the time period 8-10 PM, a viewer may manipulate a cursor 404 using a pointing device (not shown) to select, as indicated by stipple shading in FIG. 4, the World Series for immediate viewing within a window 406 on the television 214c. Other examples are possible. For example, it is contemplated that any menu-driven navigation technique or implementation may be used to enable user-interaction with the EPG 402, along with any other elements or interfaces output by the PTR 210 to the television 214c.

In addition to the EPG 402, the PTR 210 may be configured and/or arranged to output various other interactive elements or interfaces. For instance, at a particular point in time that might be considered convenient or non-intrusive to or for the end-user, such as for example during navigation of the EPG 402 as opposed to during presentation of a particular movie by or on the television 214c, the DFR service 220 of the PTR 210 may output for display by the television 214c a recommendations interface 411 as shown in FIG. 4. It is further contemplated that the DFR service 220 of the PTR 210 may output for display by the television 214c a feature shortcut selection 408 and a related features selection 410, the same of which is discussed in further detail below.

In practice, it is contemplated the DFR service 220 of the PTR 210 may over time collect and aggregate information associated with usage of or access to convenience or programming features or services offered or provided or made available by the PTR 210. For instance, over a particular time period of two (2) weeks, for example, the PTR 210 may count how many times a Favorites Menu is used or utilized to access certain broadcast programming, how many times a Recording Timer is used or utilized to record certain broadcast programming, and whether or not one or more Parental Control-related features have or have not been enabled. Here, the DFR service 220 of the PTR 210 may identify ones of the convenience or programming features or services offered or provided or made available by the PTR 210 that have not been accessed or used or utilized at least once, and/or have not been accessed or used or utilized a requisite number of times over a particular time period and then, at a convenient or non-intrusive time as mentioned above, output for display by the television 214c the recommendations interface 411 to provide an indication to the end-user that the subject features or services are in fact available.

For example, as shown in FIG. 4 listed within an Available Services or Features section 412, the recommendations interface 411 includes an indication that the following features or service are available for use or utilization by the end-user: Recording Timers; Parental Controls; Favorites Menu. In general, it is contemplated that the end-user may initially select any particular one of the features or service as itemized, indicated by intermittent line in FIG. 4, and then select an explore selection 414 to learn more about and possible access or enable a corresponding feature or service. Additionally, or alternatively, it is contemplated that the end-user may initially select any particular one of the features or service as itemized, and then the DFR service 220 of the PTR 210 may automatically, i.e., without direct or explicit end-user request or input, engage or activate a particular feature or service to assist or provoke the end-user to use or utilize the same. For example, as shown in FIG. 4, the DFR service 220 of the PTR 210 may populate the Favorites Menu for the end-user, possibly in light of the above-mentioned collected and aggregated information associated with usage of or access to particular features or services offered or made available the PTR 210, to include or exhibit the following channels: 1. Channel 2012; 2. Channel 2209; 3. Channel 4567; etc.

It is still further contemplated that the end-user may customize any recommended feature or service to even further assist or provoke the end-user to use or utilize the same. For example, the end-user may initially select any particular one of the features or service as itemized, indicated by intermittent line in FIG. 4, and then select a customize selection 416 to implement the mentioned customization. For example, the end-user may initially select the Favorites Menu, and then observe that the DFR service 220 of the PTR 210 has populated the Favorites Menu for the end-user as: 1. Channel 2012; 2. Channel 2009; 3. Channel 4567; etc. Here, the end-user may then select the customize selection 416 and, in response, the DFR service 220 of the PTR 210 may output for display a customization interface 418. In this example, the end-user may manipulate, using the cursor 404 for instance, the ordering of the channels as listed within the Favorites Menu as: 1. Channel 2009; 2. Channel 4567; 3. Channel 2012; etc., to more accurately capture the preferences of the end-user.

Referring still to the customization interface 418, it is contemplated that end-user may optionally exit the customization interface 418 and/or recommendations interface 411 altogether upon selection of an exit selection 420. Alternatively, the end-user may engage or otherwise activate the Favorites Menu, continuing with the present example throughout, upon selection of an enable selection 422. Additionally, as briefly mentioned above in connection with FIG. 1, the end-user may engage or otherwise activate a shortcut or link that when selected brings the end-user directly to the Favorites Menu, for example, without having to navigate additional screens or interfaces, upon selection of a generate shortcut selection 424. The shortcut or link in this example is shown in FIG. 4 as feature shortcut 408. Here, the end-user may select the feature shortcut 408 and, in response, the DFR service 220 of the PTR 210 may output for display the Favorites Menu for instant access by the end-user. Still many other features or aspects are contemplated for enhancing end-user QoE in accordance with the present disclosure.

Figure 5:
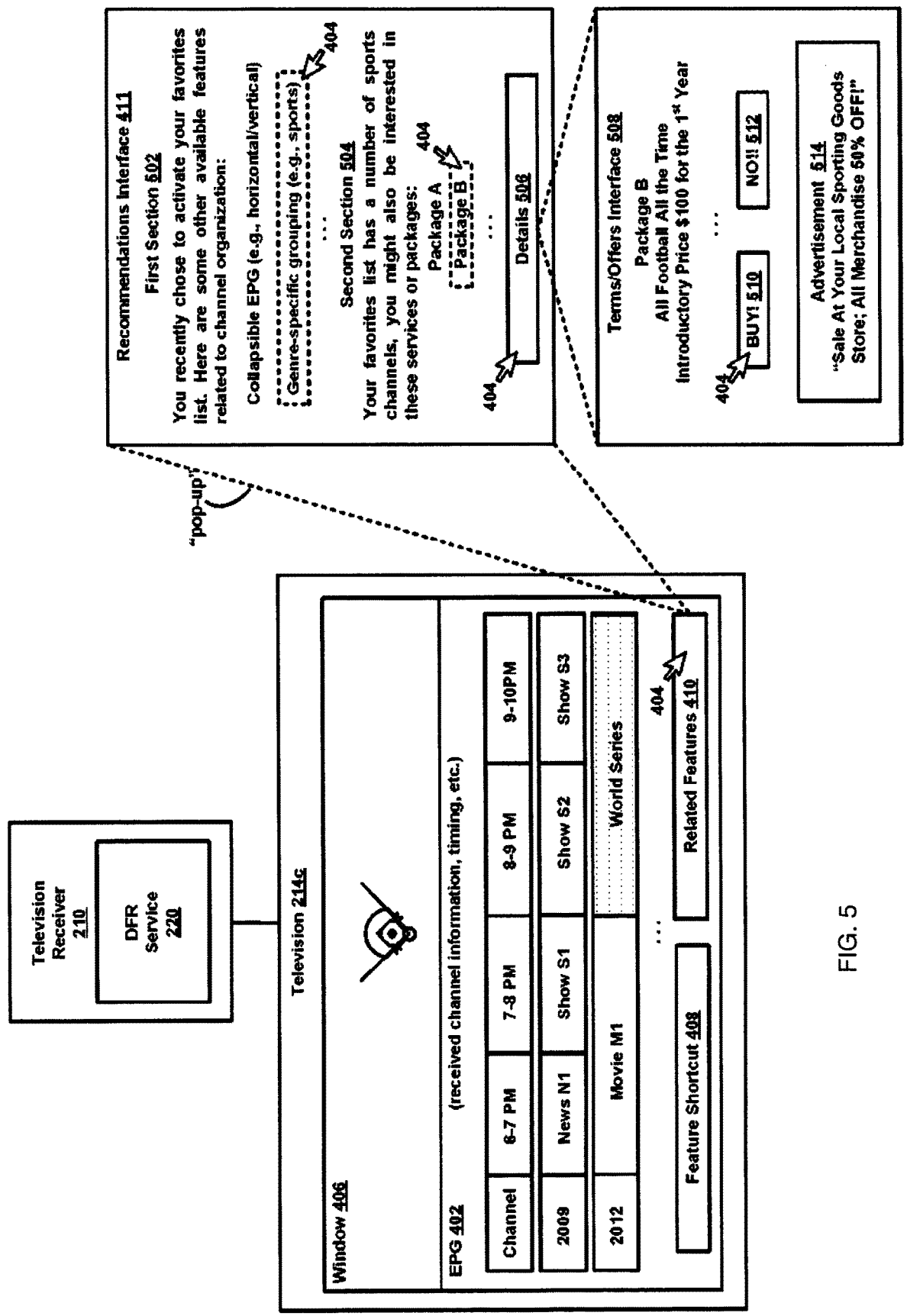
FIG. 5 shows second example aspects of the system of FIG. 2 in detail

Referring now to FIG. 5, second example aspects of the system 200 of FIG. 2 are shown in accordance with the present disclosure. In particular, and as mentioned above, the DFR service 220 of the PTR 210 may output for display by the television 214c the related features selection 410. Here, it is contemplated that the related features selection 410 may provide a mechanism for an end-user to explore various other features or services offered or provided or made available by the PTR 210, the service provider 202 (see FIG. 2), and/or a third party entity, based upon or in light of those features or services offered or provided or made available by the PTR 210 that have been previously accessed or utilized.

For example, and continuing with the Favorites Menu example, the end-user may manipulate the cursor 404 to select a related features selection 410 and, in response, the DFR service 220 of the PTR 210 output for display by the television 214c a variation of the recommendations interface 411 introduced above in connection with FIG. 4. Here, it is contemplated that the recommendations interface 411 may include a first section 502 that itemizes a number of features or services related to "channel organization," since in the above-example the end-user had newly activated or engaged the Favorites Menu. It will be appreciated that the content of the first section 502 is an example only. Other examples are possible, and the information itemized within the first section 502 may or may not be implementation-specific.

As shown in FIG. 5, the first section 502 may specify: "You recently chose to activate your favorites list. Here are some other available features related to channel organization: Collapsible EPG; Genre-specific grouping" and etc. An example of collapsing an EPG "vertically" is shown in FIG. 5 wherein the sequence of channels is shown as: 2009; 2012. Here, the EPG 402 is vertically collapsed since, assuming channels 2010 and 2011 exist, channels 2010 and 2011 are not shown as itemized or listed within the EPG 402. Rather, channels 2010 and 2011 may be "collapsed" or filtered-out so that those channels are not shown within the EPG 402. An example of genre-specific grouping may be described or understand in a similar manner in which channels 2009 and 2012 as shown within the EPG 402 could be "sports" channels wherein channels 2010 and 2011 could be filtered-out assuming those channels exist and are not sports channels. A similar operation may be implemented so as to "horizontally" collapse the EPG 402, wherein the parameter is "time." For example, the time period "7-8 PM" may be "collapsed" or filtered-out so that only time periods "6-7 PM" and "8-9 PM" and "9-10 PM" are shown within the EPG 402.

The recommendations interface 411 may further include a second section 504. Here, it is contemplated that second section 504 may itemize a number of channel packages available for purchase based upon those channels itemized within the newly activated or engaged Favorites Menu. It will be appreciated that the content of the second section 504 is an example only. Other examples are possible, and the information itemized within the second section 504 may or may not be implementation-specific. As shown in FIG. 5 though, the second section 504 may specify: "Your favorites list has a number of sports channels, you might also be interested in these services or packages: Package A; Package B" and etc. Here, it is contemplated that Package A and Package B may be sports channel packages available for purchase, and that the end-user may explore terms/offers associated with each of those packages by selecting a particular package, indicated in FIG. 5 by intermittent line, and then a details selection 506.

In response to selection of the details selection 506, the DFR service 220 of the PTR 210 may output a terms/offers interface 508 to and for display by the television 214c. For example, as shown in FIG. 5, the terms/offers interface 508 may specify: "Package B: All Football All the Time; Introductory Price $100 for the $1^{st}$ year." Here, it is contemplated that the end-user may purchase the package in accordance with the terms via selection of a buy selection 510 or decline via selection of a decline selection 512. It is further contemplated that the DFR service 220 of the PTR 210 may insert into the terms/offers interface 508 one or more advertisements consistent or relevant to the content associated with the Package B, and still further those advertisements may be region or area specific. For example, the DFR service 220 may insert an advertisement into the terms/offers interface 508 that indicates or specifies that "Sale At Your Local Sporting Goods Store; All Merchandise 50% OFF!" It will be appreciated that many other examples are possible as well.

Figure 6:
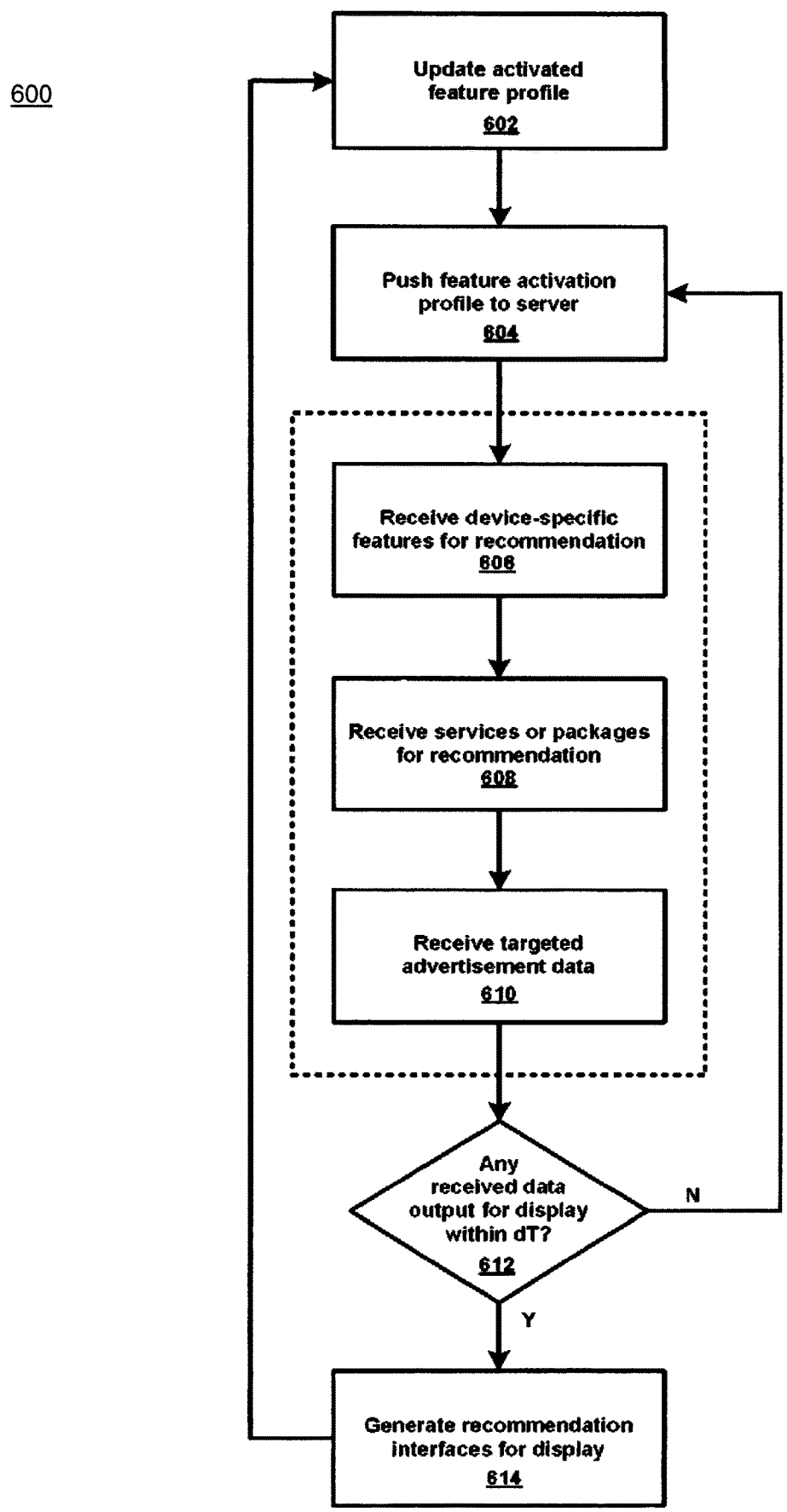
FIG. 6 shows a second example method according to the disclosure.

Referring now to FIG. 6, a second example method 600 is shown in accordance with the present disclosure. The method 600 is described as implemented by or on the PTR 210 of FIG. 2, and is related to a communication sequence between the PTR 210 and the server 208, whereby the server 208 sends or otherwise transmits data to the PTR 210 to enable the DFR service 220 of the PTR 210 to populate one or more of the interfaces of FIGS. 4-5 with information for display or presentation to an end-user in a manner as discussed above. Other examples are however possible. For example, one or more modules or steps of the example method 600 may be implemented by one or more of the other respective devices or components within the example system 200 of FIG. 2 as described above.

At step 602, the DFR service 220 of the PTR 210 may update a feature or service profile specific to the PTR 210 in light of a feature or service newly activated or engaged by an end-user. For example, the profile may be updated to reflect or otherwise indicate activation of a Favorites Menu in a manner consistent with that as discussed throughout. Next, at step 604, the DFR service 220 of the PTR 210 may push or transmit or otherwise transfer the feature or service profile specific to the DFR service 220 of the server 218 (see FIG. 2). Here, it is contemplated that the feature or service profile specific to the PTR 210 may also include collected and aggregated information associated with end-user usage of or access to features or services offered or provided or made available by the PTR 210. In this manner, it is contemplated that the DFR service 220 of the PTR 210 may derive and acquire, based upon such information as contained within the feature or service profile specific to the PTR 210, relevant or germane information for display or presentation to an end-user within the interactive interfaces of FIGS. 4-5 in a manner as discussed above.

Next, at steps 606, 608, and 610, respectively, the DFR service 220 of the PTR 210 may receive from the DFR service 220 of the server 218 information or data associated with feature, services or packages, and targeted advertisement data that may ultimately be rendered for display within the interactive interfaces of FIGS. 4-5 by the DFR service 220 of the PTR 210 when appropriate or necessary. Here, it is contemplated that the data received by the DFR service 220 of the PTR 210 at steps 606, 608, and 610 may be received separately, together or concurrently, or any combination thereof. Next, at step 612, the DFR service 220 of the PTR 210 may make a determination as to whether or not any of the data or information received at steps 606, 608, and 610 has been output for display to an end-user within a pre-determined and configurable time period, such as forty-eight (48) hours for example. Here, it is contemplated that this may ensure that any information displayed within the interactive interfaces of FIGS. 4-5 is timely and up-to-date.

When, for example, a determination is made that none of the data or information received at steps 606, 608, and 610 has been output for display to an end-user within the pre-determined and configurable time period, process flow within the method 600 may branch back to step 604, so that the DFR service 220 of the PTR 210 may have or possess timely and up-to-date data for possible display to an end-user. When, however, a determination is made that at least a portion of the data or information received at steps 606, 608, and 610 has been output for display to an end-user within the pre-determined and configurable time period, process flow within the method 600 may branch back to step 602, so that the feature or service profile specific to the PTR 210 may be updated, and then flow within method 600 may continue in a manner as discussed. Accordingly, the DFR service 220 of the PTR 210 may at all times be in a state by which relevant, timely and up-to-date data may be output for display to an end-user upon command.

The present disclosure is generally directed to or towards systems and methods for enhancing end-user QoE. This is achieved at least in part by monitoring end-user interactions with a particular computing device, such as a television receiver for example, and then providing recommendations to the end-user as to features or services that are available for access but are not or have not been previously used or utilized. Although not so limited, in one example implementation a method may include or comprise determining, by a computing device, number of times particular features of the computing device are accessed over a period of time. For example, the computing device may determine that an end-user has accessed five (5) different applications or programs of or implemented by the computing device over a one (1) week time period, and that program A was accessed zero (0) times, program B was access one (1) time, program C was accessed two (2) times, program D was accessed three (3) times, and program E was access four (4) times. Other examples are possible.

The method may further include or comprise identifying, by the computing device, particular features of the computing device accessed over the period of time a number of times less than or equal to a predetermined threshold value. Here, it is contemplated that the threshold value is user-configurable and/or system-defined (e.g., default), and may correspond to an integer value, such as two (2) for example. Accordingly, to continue with the example, the computing device may identify programs A-C as particular features of the computing device accessed over the period of time a number of times less than or equal to a predetermined threshold value. Other examples are possible.

The method may further include or comprise outputting, by the computing device for presentation by a display device, a user interface that itemizes particular features of the computing device accessed over the period of time a number of times less than or equal to the predetermined threshold value. Here, it is contemplated that a user interface may be generated by the computing device and output for presentation by a display device, such as a screen or monitor either integral or external the computing device. Accordingly, to continue with the example, the computing device may generate and output for display an interface that itemizes programs A-C as particular features of the computing device accessed over the period of time a number of times less than or equal to a predetermined threshold value.

Advantageously, an end-user may be made specifically aware of availability of programs A-C even though the end-user might not be inclined or even interested in exploring each and every feature or service offered by the computing device. Other benefits and/or advantages are possible as well.

Furthermore, variants on the above examples are possible as well. For example, with reference to the recommendations interface 411 of FIG. 4, the same may additionally or alternately include variants for user action such as, for example: Reject (Refuse) and Not Propose Later; Postpone and Propose Later; Apply As Is; Customize; Help (Explore). Furthermore, items within the recommendations interface 411 of FIG. 4 may be shown one at a time, may be random or according to a priority. Further, a parental control feature may be proposed for a user if during step 102 of FIG. 1 browsing of cartoons or teenager-oriented soap operas was detected. Additionally, with reference to FIG. 5, along with "genre-specific grouping" a "language-specific grouping" is contemplated, that which may be useful or beneficial for hotels and guest houses, for people who study foreign languages. Also it is contemplated that full-HD channels may be combined in a separate group. Additionally, with reference to FIG. 6, it is contemplated that users may be enabled to reject content-dependent advertising. Otherwise after adult movie browsing a user may receive explicit advertising. Such a step may be inserted within the example method 600 before steps 608 and 610 for example. Other examples are possible.

Figure 7:
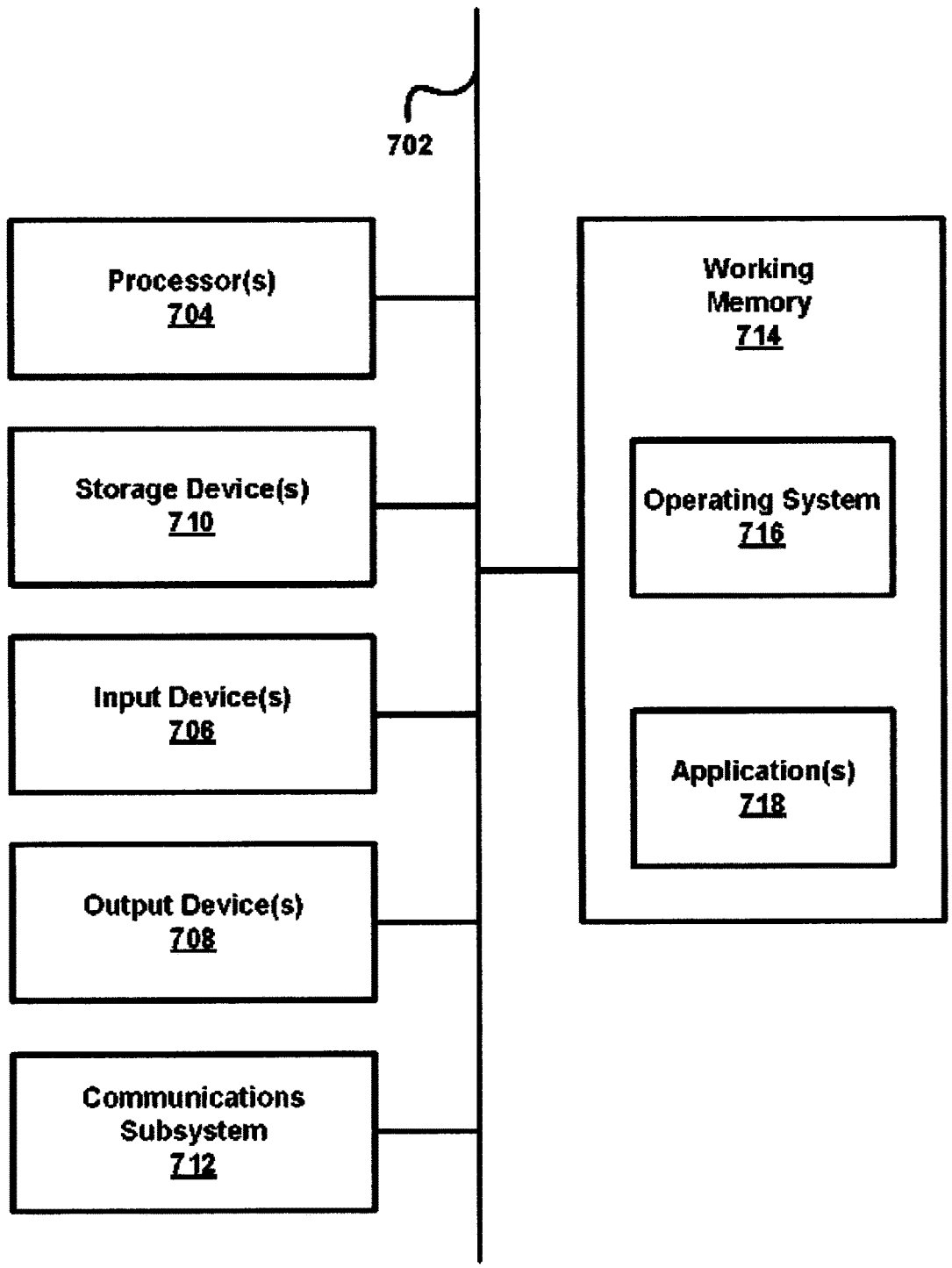
FIG. 7 shows an example computing system or device.

FIG. 7 shows an example computer system or device 700 in accordance with the disclosure. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 700, such as any of the respective elements of at least FIG. 2. In this manner, any of one or more of the respective elements of at least FIG. 2 may be configured and/or arranged, wholly or at least partially, enhancing computing device end-user QoE, in manner consistent with that discussed above in connection with FIGS. 1-7. For example, any of one or more of the respective elements of at least FIG. 2 may be configured and/or arranged to perform and/or include instructions that, when executed, perform the method of FIG. 1 and/or FIG. 6. Still further, any of one or more of the respective elements of at least FIG. 2 may be configured to perform and/or include instructions that, when executed, instantiate and implement functionality of the PTR 210 and/or the computing devices 216*a*-*b* and/or the server(s) 218 of FIG. 2.

The computer device 700 is shown comprising hardware elements that may be electrically coupled via a bus 702 (or may otherwise be in communication, as appropriate). The hardware elements may include a processing unit with one or more processors 704, including without limitation one or more general-purpose processors and/or one or more special-purpose processors (such as digital signal processing chips, graphics acceleration processors, and/or the like); one or more input devices 706, which may include without limitation a remote control, a mouse, a keyboard, and/or the like; and one or more output devices 708, which may include without limitation a presentation device (e.g., television), a printer, and/or the like.

The computer system 700 may further include (and/or be in communication with) one or more non-transitory storage devices 710, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 700 might also include a communications subsystem 712, which may include without limitation a modem, a network card (wireless and/or wired), an infrared communication device, a wireless communication device and/or a chipset such as a Bluetooth™ device, 702.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 712 may permit data to be exchanged with a network (such as the network described below, to name one example), other computer systems, and/or any other devices described herein. In many examples, the computer system 700 will further comprise a working memory 714, which may include a random access memory and/or a read-only memory device, as described above.

The computer device 700 also may comprise software elements, shown as being currently located within the working memory 714, including an operating system 716, device drivers, executable libraries, and/or other code, such as one or more application programs 718, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 710 described above. In some cases, the storage medium might be incorporated within a computer system, such as computer system 700. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 700) to perform methods in accordance with various examples of the disclosure. According to a set of examples, some or all of the procedures of such methods are performed by the computer system 700 in response to processor 704 executing one or more sequences of one or more instructions (which might be incorporated into the operating system 716 and/or other code, such as an application program 718) contained in the working memory 714. Such instructions may be read into the working memory 714 from another computer-readable medium, such as one or more of the storage device(s) 710. Merely by way of example, execution of the sequences of instructions contained in the working memory 714 may cause the processor(s) 704 to perform one or more procedures of the methods described herein.

The terms "machine-readable medium" and "computer-readable medium," as used herein, may refer to any non-transitory medium that participates in providing data that causes a machine to operate in a specific fashion. In an example implemented using the computer device 700, various computer-readable media might be involved in providing instructions/code to processor(s) 704 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 710. Volatile media may include, without limitation, dynamic memory, such as the working memory 714.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 704 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 712 (and/or components thereof) generally will receive signals, and the bus 702 then might carry the signals (and/or the data, instructions, etc. carried by the signals) to the working memory 714, from which the processor(s) 704 retrieves and executes the instructions. The instructions received by the working memory 714 may optionally be stored on a non-transitory storage device 710 either before or after execution by the processor(s) 704.

It should further be understood that the components of computer device 700 can be distributed across a network. For example, some processing may be performed in one location using a first processor while other processing may be performed by another processor remote from the first processor. Other components of computer system 700 may be similarly distributed. As such, computer device 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   determining, by a computing device, access rates representing numbers of times that a plurality of features of the computing device are accessed during a period of time, wherein the plurality of features of the computing device correspond to different convenience features of the computing device providing different computing device functionalities;
   outputting a user interface by the computing device for presentation by a display device, wherein the user interface includes one or more first interface elements to provide access to the plurality of features via secondary menus of the user interface, and a second interface element to provide access to a related features menu;
   receiving, by the computing device from a user, a first set of inputs corresponding to user interaction with the at least one of the one or more first interface elements indicating activation of a first feature of the plurality of features, a first of the access rates for the first feature indicating that the first feature is a favorite of the user;
   activating the first feature responsive to receiving the first set of inputs;
   receiving, by the computing device from the user, subsequent to the activating, second input corresponding to user interaction with the second interface element;
   identifying, by the computing device in accordance with receiving the second input, a second feature of the plurality of features as related to the first feature and as having a second of the access rates that is less than or equal to a predetermined threshold value during the period of time; and
   outputting, by the computing device for presentation by the display device in response to receiving the second input, a recommendations interface within the user interface that itemizes the second feature as related to the first feature.

2. The method of claim 1, wherein:
   the recommendation interface further comprises at least one field to customize the presentation of the user interface.

3. The method of claim 1, further comprising:
   outputting, by the computing device for presentation by the display device, at least one field within the user interface to access functional details associated with the second feature.

4. The method of claim 1, further comprising:
   outputting, by the computing device for presentation by the display device, at least one field within the user interface to activate the second feature.

5. The method of claim 1, further comprising:
   outputting, by the computing device for presentation by the display device, at least one field within the user interface to activate an additional feature of the plurality of features that is different from the second feature, wherein the additional feature is associated with the second feature.

6. The method of claim 1, further comprising:
   detecting, by the computing device, input corresponding to a command to customize the second feature; and
   outputting, by the computing device for presentation by the display device, a specific particular secondary menu to enable customization of the second feature.

7. The method of claim 1, further comprising:
   detecting, by the computing device, input corresponding to a command to access functional details associated with the second feature; and
   outputting, by the computing device for presentation by the display device, a specific particular secondary menu to enable access to the functional details.

8. The method of claim 1, further comprising:
   outputting, by the computing device for presentation by the display device, a specific particular secondary menu to enable activation of the second feature.

9. The method of claim 1, further comprising:
   detecting, by the computing device, input corresponding to a command to activate an additional feature of the plurality of features that is different from the second feature, wherein the additional feature is associated with the second feature; and
   outputting, by the computing device for presentation by the display device, an additional secondary menu to enable activation of the additional feature.

10. The method of claim 1, further comprising:
    outputting, by the computing device for presentation by the display device, a selectable option within the user interface for modifying access to the second feature;
    receiving input corresponding to a command to add a hyperlink to the second feature to a favorites menu of the user interface; and
    modifying the user interface to add the hyperlink to the second feature to the favorites menu of the user interface.

11. A television receiver, comprising:
    a processor; and
    a non-transitory memory communicatively coupled with and readable by the processor and having stored processor-readable instructions that, when executed by the processor, cause the processor to perform operations including:
        determining access rates representing numbers of times that a plurality of features of the television receiver are accessed during a period of time, wherein the plurality of features of the television receiver correspond to different convenience features of the television receiver providing different computing device functionalities,
        outputting a user interface by the computing device for presentation by a display device, wherein the user interface includes one or more first interface elements to provide access to the plurality of features via secondary menus of the user interface, and a second interface element to provide access to a related features menu;
        receiving, from a user, a first set of inputs corresponding to user interaction with the at least one of the one or more first interface elements indicating activation of a first feature of the plurality of features, a first of the access rates for the first feature indicating that the first feature is a favorite of the user;
        activating the first feature responsive to receiving the first set of inputs;
        receiving, from the user, subsequent to the activating, second input corresponding to user interaction with the second interface element
        identifying, in accordance with receiving the second input, a second feature of the plurality of features as related to the first feature and as having a second of the access rates that is less than or equal to a predetermined threshold value during the period of time; and
        outputting, for presentation by the display device in response to receiving the second input; a recommendations interface within the user interface that itemizes the second feature as related to the first feature.

12. The television receiver of claim 11, wherein operations further include:
    outputting, for display by the presentation device, at least one field within the user interface to customize the second feature.

13. The television receiver of claim 11, wherein operations further include:
    outputting, for display by the presentation device, at least one field within the user interface to access functional details associated with the second feature.

14. The television receiver of claim 11, wherein the plurality of secondary menus are accessible within the user interface as sub-menus of the primary menu.

15. The television receiver of claim 11, wherein the operations further include:
    outputting, for display by the presentation device, at least one field within the user interface to activate the second feature.

16. The television receiver of claim 11, wherein the operations further include:
    outputting, for display by the presentation device, at least one field within the user interface to activate an additional feature of the plurality of features that is different from the second feature, wherein the additional feature is associated with the second feature.

17. The television receiver of claim 11, wherein the user interface is an electronic program guide of the television receiver.

18. A computer-program product, comprising a non-transitory computer readable storage medium, the non-transitory computer readable storage medium storing instructions that, when executed by a processor of a television receiver, cause the processor to perform operations including:
    determining access rates representing numbers of times that a plurality of features of the computing device are accessed during a period of time, wherein the plurality of features of the computing device correspond to different convenience features of the computing device providing different computing device functionalities,
    outputting a user interface by the computing device for presentation by a display device, wherein the user interface includes one or more first interface elements to provide access to the plurality of features via secondary menus of the user interface, and a second interface element to provide access to a related features menu;
    receiving, from a user, a first set of inputs corresponding to user interaction with the at least one of the one or more first interface elements indicating activation of a first feature of the plurality of features, a first of the access rates for the first feature indicating that the first feature is a favorite of the user;
    activating the first feature responsive to receiving the first set of inputs;
    receiving, from the user, subsequent to the activating, second input corresponding to user interaction with the second interface element;
    identifying, in accordance with receiving the second input, a second feature of the plurality of features as related to the first feature and as having a second of the access rates that is less than or equal to a predetermined threshold value during the period of time; and
    outputting, by the television receiver for presentation by the display device in response to receiving the second input, a recommendations interface within the user interface that itemizes the second feature as related to the first feature.

* * * * *